United States Patent
Mendel et al.

(10) Patent No.: US 9,742,443 B2
(45) Date of Patent: Aug. 22, 2017

(54) PULSE SHAPING FOR RADIO FREQUENCY TRANSMITTERS

(71) Applicant: NXP B.V., Eindhoven (NL)

(72) Inventors: Stefan Mendel, Graz (AT); Thomas Noisternig, Graz (AT); Jingfeng Ding, Gratkom (AT); Erich Merlin, Gratkorn (AT); Michael Stark, Gratkom (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/847,810

(22) Filed: Sep. 8, 2015

(65) Prior Publication Data

US 2017/0070245 A1    Mar. 9, 2017

(51) Int. Cl.
| | | |
|---|---|---|
| H04B 1/04 | (2006.01) | |
| H04W 4/00 | (2009.01) | |
| G06K 19/07 | (2006.01) | |
| H04B 5/00 | (2006.01) | |
| H04L 25/00 | (2006.01) | |
| H04L 25/03 | (2006.01) | |
| G06K 7/10 | (2006.01) | |

(52) U.S. Cl.
CPC ........... *H04B 1/04* (2013.01); *G06K 7/10237* (2013.01); *G06K 19/0723* (2013.01); *H04B 5/0031* (2013.01); *H04L 25/00* (2013.01); *H04L 25/03006* (2013.01); *H04W 4/008* (2013.01)

(58) Field of Classification Search
CPC .... H02M 3/156; H02M 3/33507; H04B 1/04; H04W 4/008
USPC ............................. 323/285; 455/334, 91, 130
See application file for complete search history.

(56) References Cited

U.S. PATENT DOCUMENTS

| 6,144,862 A * | 11/2000 | Oliver ............... H04L 25/03834 375/285 |
|---|---|---|
| 2003/0011485 A1* | 1/2003 | Alrabady ............... G08C 19/28 340/12.52 |
| 2004/0072552 A1* | 4/2004 | Park ................... G06K 19/0723 455/334 |
| 2009/0072807 A1* | 3/2009 | Qiu ................... H02M 3/33507 323/285 |
| 2014/0004794 A1 | 1/2014 | Contaldo et al. |
| 2016/0197718 A1 | 7/2016 | Michel et al. |

FOREIGN PATENT DOCUMENTS

| WO | WO 2009/148372 A1 | 12/2009 |
|---|---|---|
| WO | WO 2015/036682 A1 | 3/2015 |

OTHER PUBLICATIONS

Cordier, Nicolas "How new 'boostedNFC' technology enables mobile phones and wearable devices to emulate contactless card reliably", AMS Technical Article pp. 1-8.
Extended European Search Report mailed Jan. 25, 2017, for corresponding European Patent Application No. 16185151.4.

* cited by examiner

*Primary Examiner* — Janice Tieu

(57) ABSTRACT

Transients caused by load modulation can fee compensated far by adjusting pulse shapes. A radio frequency (RP) carrier signal can be modulated using load modulation. For the modulated RF carrier signal a particular pattern can be detected for a symbol period that precedes a second symbol that does not use load modulation. In response to the detecting, a pulse shape of the first symbol can be adjusted to mitigate the transients.

15 Claims, 4 Drawing Sheets

PULSE SHAPING FOR RADIO FREQUENCY TRANSMITTERS

OVERVIEW

Aspects of various embodiments are directed to pulse shaping or wave shaping by a transmitter, more particular aspects are directed toward pulse shaping for a transmitter that uses load modulation, such as active load modulation (ALM).

Certain wireless radio frequency (RF) communication protocols are designed to facilitate transmitter circuits that occupy a small physical footprint, are relatively inexpensive, and consume low amounts of power. One such communication protocol is referred to as near-field communication (NFC) protocol NFC devices can use magnetic induction (near field communications) between two antennas to effect communications. The NFC protocol specifics the use of an unlicensed radio frequency ISM band of 13.56 MHz.

NFC-enabled devices can support three modes of operation: card-emulation mode, peer-to-peer mode, and reader/writer mode. NFC technology for the different operating modes arc based on the ISO/IEC 18092 NFC IP-1, JIS X 6319-4 and ISO/IEC 14443 contactless smart card standards (sometimes referred to as NFC-A, NPC-B and NFC-F). In card emulation mode, an NFC-capable device functions like a smart card to allow for existing infrastructure, normally used with smart cards, to be used to perform transactions such as credit/debit purchases and ticketing.

NFC-capable devices that operate in card emulation, mode can use load modulation of a received RF signal to transmit data. The NFC-capable devices may suffer from problems associated with poor modulation amplitude, such as small functional communication distances that are worsened by antenna orientation mismatches. Active load modulation can increase the modulation amplitude but may have undesired side-effects.

These and other matters have presented challenges to efficiencies of wireless communication devices, methods, and implementations, for a variety of applications.

SUMMARY

Various embodiments arc directed toward a method for compensating for transients caused, by load modulation by adjusting pulse shapes. The method includes modulating a radio frequency (RF) carrier signal using load modulation; detecting, for the modulated RF earner signal, a particular symbol pattern for a symbol period that precedes a second symbol that does not use load modulation; and adjusting, in response to the detecting, a pulse shape of the first symbol to mitigate the transients.

Certain embodiments are directed toward a device that includes a modulation circuit configured to modulate a radio frequency (RF) earner signal using load modulation and according to a plurality of symbols; a detection circuit configured to detect, for the modulated RF earner signal, a first symbol, pattern preceding a second symbol pattern that does not use load modulation; and a pulse shaping circuit configured to adjust, in response to the detection circuit, a pulse shape of the first symbol to mitigate transients in the second symbol The above discussion/summary is not intended, to describe each embodiment or every implementation of the present disclosure. The figures and detailed description that follow also exemplify various embodiments.

BRIEF DESCRIPTION OF FIGURES

Various example embodiments may be mote completely understood in consideration of the following detailed description in connection with the accompanying drawings, in which.

Figure 1:
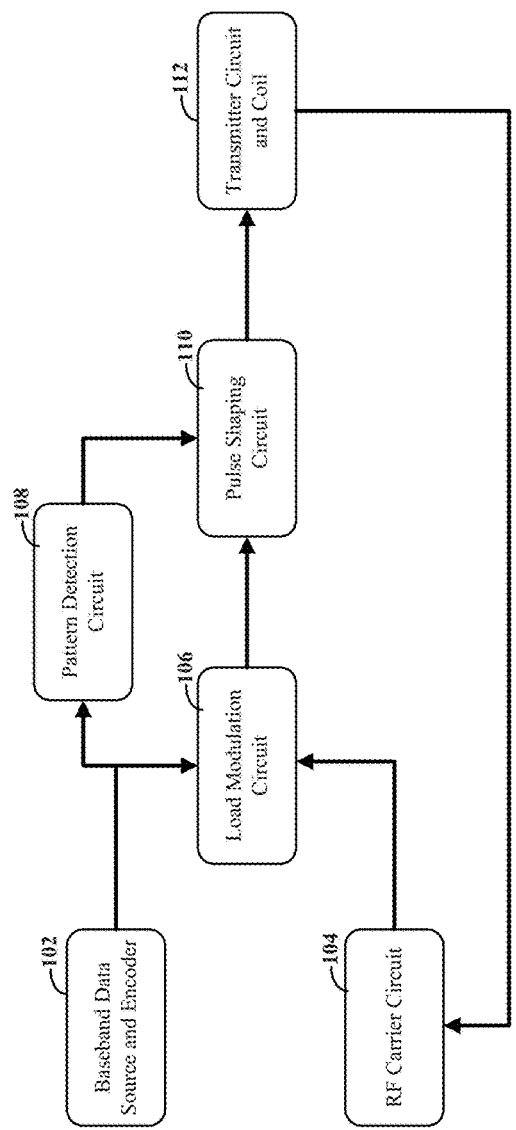
FIG. 1 depicts a block diagram for a transmitter device with pulse shaping capabilities, consistent with embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving pulse shaping in response to detected symbol patterns and combinations. In certain implementations, aspects of the present disclosure have been shown to be beneficial when used in the contest of NFC-capable devices. In some embodiments, the NFC-capable devices use ALM in a card emulation mode. These and other aspects can be implemented to address challenges, including those discussed in the background above. While not necessarily so limited, various aspects may be appreciated through a discussion of examples using such exemplary contexts.

Various embodiments of the present disclosure are directed toward the mitigation of transient responses in wireless communications. For instance, a transmitter device can include circuits that are configured to detect specific communication pattern(s) that are subject to communication errors caused by transient responses and to modify a pulse shape for the detected communication patterns. Particular embodiments are directed toward transients resulting from the use of load modulation (such as ALM) in a communication protocol that also uses the lack of modulation to convey data, such as identifying the end of a communication with an unmodulated symbol period. The circuits can be configured to detect an end of communication condition and to adjust, in response to the detection, the pulse shape of a preceding symbol in a manner that mitigates a transient from the adjusted pulse.

In some instances, the circuits can be configured to detect a communication pattern where a symbol corresponding to a particular type(s) of symbol immediately precedes an unmodulated symbol period. In response to this detection, the pulse shape of the preceding symbol can be adjusted to mitigate a transient in the unmodulated symbol period.

Consistent with embodiments, the adjustment of the pulse shape can include shortening the duration of the poise. For instance, the end of the pulse can be moved earlier in time so that there is more time between the end of the pulse aid the unmodulated symbol period. This can be particularly useful for shifting the timing of the corresponding transient earlier so that some, or all, of the transient is no longer present during the unmodulated symbol period.

In particular embodiments, the circuits can be configured to communicate using NFC protocols, and more particularly, using ALM as part of a card emulation mode. As discussed in more detail herein, the card emulation mode can include a communication pattern where at least a portion of the second half of a symbol is modulated and that symbol is immediately followed by an unmodulated symbol that identifies the end of the communication. Accordingly, a transient from the second half of the symbol that appears in the unmodulated symbol can result in a receiver circuit incorrectly detecting modulation during the unmodulated symbol.

While various embodiments are discussed in the context of ALM, it is recognised that transmitters that use passive load modulation, can also suffer from problems with transients in unmodulated symbols. Accordingly, the various types of pulse shaping discussed herein can be generally also be applied in connection with passive load modulation.

Turning now to the figures, FIG. 1 depicts a block diagram for a transmitter device with pulse shaping capabilities, consistent with embodiments of the present disclosure. The transmitter device shown in FIG. 1 can be used to modulate a received RF carrier signal according to a communication protocol. More particularly, an RF carrier signal can be received from a transmitter circuit and associated coil 112. The RF carrier signal can be processed by an RF carrier circuit 104 to produce an output signal that can be used by modulation circuit 106 to provide load modulation, which can be ALM in various embodiments. For instance, the RF carrier circuit 104 can include a phase-locked loop (PLL) circuit that is driven by the received RF carrier signal.

Base band data source and encoder circuit 102 can be configured to retrieve data from a memory circuit or other source. The data can then be encoded according to a particular transport protocol and using, for example Miller coding or Manchester coding. In certain embodiments, the transport protocol defines data communications according to data frames that have start and stops defined with particular coding patterns. For example, the transport protocol can indicate the end of a frame (EOF) (also referred to as end-of-communication or "EOC"), at least in part, by the presence of at least one unmodulated symbol period.

Modulation circuit 106 can be configured to provide an ALM control signal that is based upon the output from the RF carrier circuit 104 and the baseband data source said encoder circuit 102. In particular, the ALM control signal can produce an RF signal that is phase-aligned with the received RF carrier signal and that is windowed or gated by the output of the baseband data source and encoder circuit 102. Consistent with embodiments, the output of modulation circuit 106 is a set of pulses for corresponding symbol periods. Each pulse can be generated from windowing the RF signal according to the encoding protocol and at a subcarrier frequency. For example, NFC communications can use a 13.56 MHz RF carrier signal, while the subcarrier frequency can be around 848 KHz. The subcarrier can then be modulated by the encoded data signal at a bit rate of 106 kBit/s. Accordingly, each bit can contain multiple subcarrier pulses and each subcarrier pulse can contain multiple RF signal pulses.

The output of the ALM circuit 106 can then be provided to pulse shaping circuit 110, which is configured to adjust the subcarrier pulse shape in response to a signal provided by pattern detection circuit 108. Pattern detection circuit 108 can be configured to detect a particular encoding/symbol pattern for the data encoded by baseband data source and encoder circuit 102. For example, the pattern detection circuit 108 can be configured to detect an unmodulated symbol period (e.g., indicating an EOF) that is preceded by a particular symbol having a transient that can carry over into the unmodulated symbol period. This particular symbol may include modulation of the RF carrier signal in the second half of a time period for the particular symbol. Upon detection of the particular pattern, the pattern detection circuit 108 can provide a notification signal to a pulse shaping circuit 110. The output of poise shaping circuit 110 can be provided to a transmitter circuit and a coil 112 for transmission of the data from baseband data source and encoder circuit 102 (via load modulation of the RF carrier signal).

According to embodiments of the present disclosure, the pulse shaping circuit 110 can be configured to respond to a notification from the pattern detection circuit 108 by adjusting a pulse in the symbol preceding the unmodulated symbol period. In some embodiments, the adjustment can include shortening the subcarrier pulse duration by adjusting the windowing of the RF carrier signal for a last subcarrier pulse in the symbol preceding the unmodulated symbol period (or just the "preceding symbol"). In various embodiments, the adjustment can include completely removing the last subcarrier pulse from the preceding symbol. Pulse shaping circuit 110 can also be configured to shift the timing of the last subcarrier pulse earlier in the preceding symbol period. In certain embodiments, pulse shaping circuit 110 can be configured to lessen the amplitude of the signal. This can be done by lessening the drive strength for the ALM of the last subcarrier pulse, or use (passive) load modulation for the last subcarrier pulse. Pulse shaping circuit 110 can be configured to use one or more combinations of the different pulse shaping adjustments discussed herein. For example, the last subcarrier pulse could be shifted in time and shortened in duration. As another example, the drive strength of the ALM could be lessened along with a shifting of the subcarrier pulse timing, a shortening of the subcarrier pulse duration, or both shifting and shortening. Further, amplitude reduction can be used with one or both of shifting and shortening of the subcarrier pulses. Pulse shaping adjustments other than those expressly stated herein can also be used.

In certain embodiment, pulse shaping circuit 110 can provide pulse shaping for subcarrier pulses that are not identified by pattern detection circuit 108. This pulse shaping can be used for overshoot and undershoot protection. This can include producing wave shapes that comply with specification requirements (consider an example of how the prior pattern was modified). When a signal from pattern detection circuit 108 is received, however, pulse shaping circuit 110 can provide a different adjustment relative to the other subcarrier pulses.

Consistent with embodiments, the circuits depicted in FIG. 1 can be implemented using a specially-programmed processor circuit or microcontroller circuit, programmable logic device (PLD), discrete logic, or combinations thereof.

In some embodiments, multiple ones of the depicted circuits can use the same circuitry (e.g., using a common microcontroller).

Figure 2:
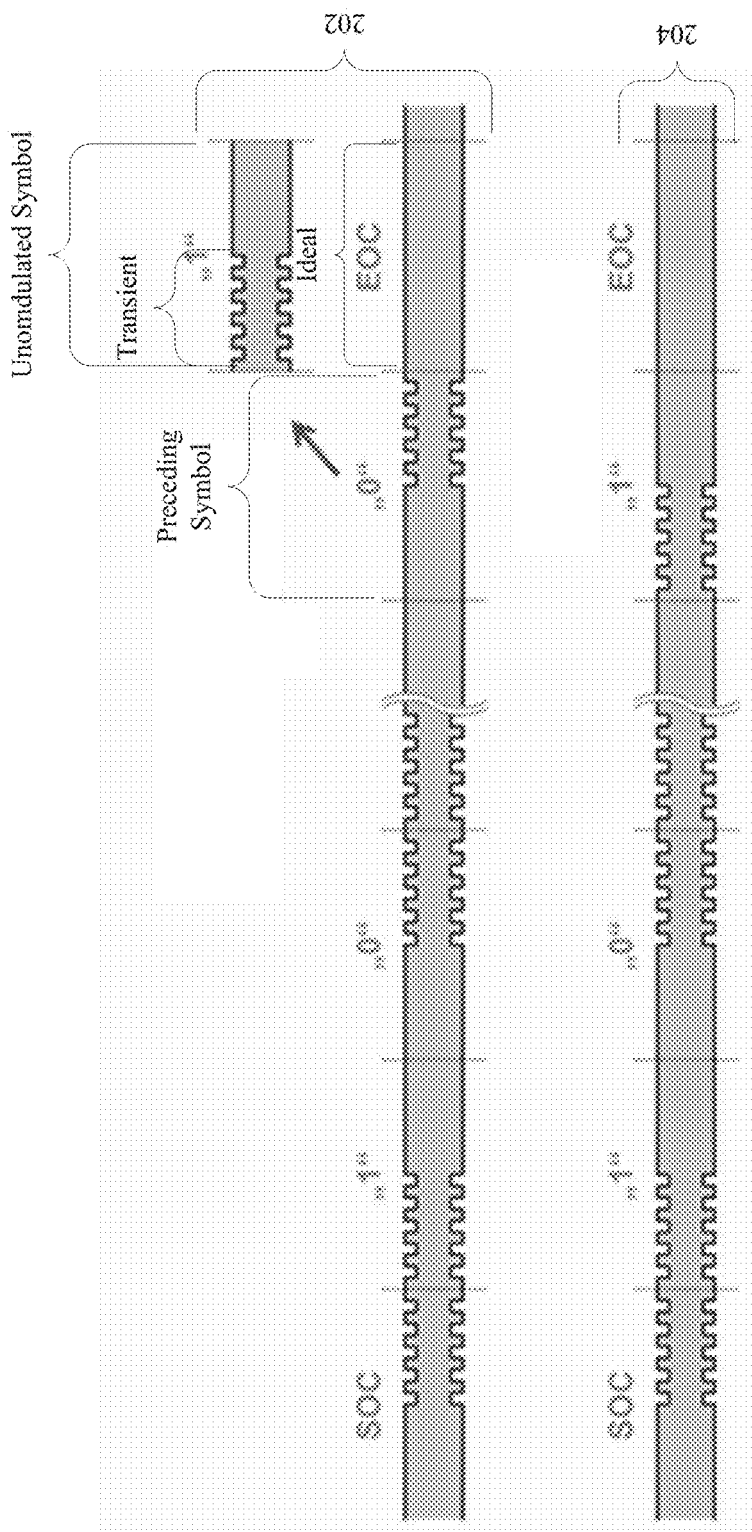
FIG. 2 depicts a timing diagram for communication frames, consistent with embodiments of the present disclosure.

FIG. 2 depicts a timing diagram for communication frames, consistent with embodiments of the present disclosure. FIG. 2 shows timing diagrams for two different frames 202, 204. Each of the frames begins with a start-of-communication (SOC) pattern and ends with an end-of-communication (EOC) pattern in the example modulation and encoding scheme shown by FIG. 2, each symbol period is divided into two portions, corresponding to a first half and a second half of the symbol period. Modulation of the RF carrier signal in the first half of the symbol can represent a binary "1" while modulation of the RF carrier signal in the second half of the symbol can represent a binary "2". It is understood that the binary values and associated symbol portions are arbitrary, and further, that different encoding schemes can be used.

The transmission of frame 202 is depleted with the last data bit corresponding to a "0" value, which results in modulation occurring at, or near, the end of the symbol period. The symbol period that immediately follows represents an EOC for which, there is no modulation during the symbol period. This can result in a transient from the modulation appearing in the first half of the symbol period for the EOC, which would then be interpreted as a "1" value instead of an EOC. As discussed herein, a pattern detection circuit can be configured to detect this pattern, where there is a "0" bit followed by an EOC. More generally, the pattern can be modulated in the second half of a symbol period that is followed by an unmodulated symbol period (which can correspond to an EOC). In response, a subcarrier pulse of the symbol preceding the EOC can be shaped in the manner discussed herein so as to remove or mitigate the transient relative to the EOC.

The transmission of frame 204 is depicted with the last data bit corresponding to a "1" value, which results in the modulation occurring at, or near, the beginning of the symbol period (in this case throughout the first half of the symbol period. As such, the transient from the modulation is not present in the EOC in any meaningful amount, if at all. Accordingly, the pattern detection circuit will not detect this pattern as requiring pulse shaping relative to a transient in the EOC.

While FIG. 2 shows a signaling scheme that is based upon a symbol period that is split into two halves with modulation occurring during either of the halves, other signaling schemes are possible. The pattern detection circuit can be configured to accommodate such schemes by detecting patterns in which modulation occurs in the second half of the symbol period (whether or not the modulation occurs during the entire second half of the symbol period). In certain embodiments, the pattern detection circuit can be configured to detect more specific patterns, such as discriminating between patterns based upon whether or not modulation occurs at the end (or sufficiently close to the end) of the symbol period to result in unwanted transients in the following symbol.

Figure 3:
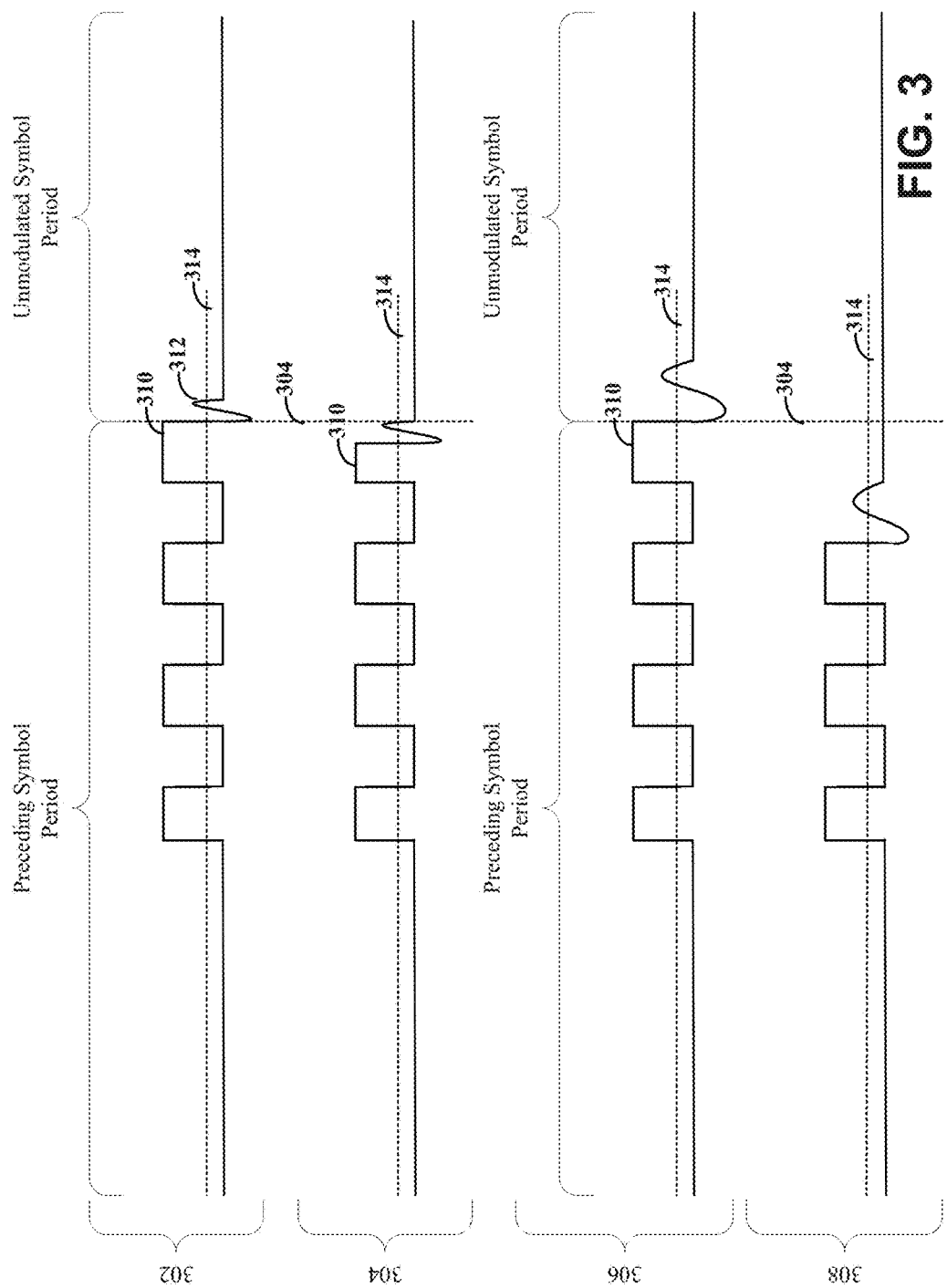
FIG. 3 depicts a timing diagram for subcarrier pulses, consistent with embodiments of the present disclosure.

FIG. 3 depicts a timing diagram for subcarrier pulses, consistent with embodiments of the present disclosure. A first timing diagram 302 shows a communication pattern where the subcarrier pulses occur near the end of the last data-carrying symbol period, which is the symbol period immediately preceding the unmodulated symbol period (e.g., representing the EOC). As discussed herein, each of the subcarrier pulses can be generated using ALM. The last pulse 310 ends proximate to the unmodulated symbol period resulting in a situation where the transient 312 is sufficient to cause a false reading in the unmodulated period, for example, if the detection threshold 314 for modulation is exceeded, then the receiver circuit may decode the unmodulated symbol period as carrying valid data (e.g., a "1" if using the encoding described in connection with FIG. 2).

Timing diagram 304 shows the same communication patterns as diagram 302 with additional poise shaping. In particular, the pulse shaping involves shortening the duration of the pulse 310 such that some, or all, of the transient is moved, from the unmodulated symbol period to the preceding symbol period. Moreover, reducing the duration of the pulse can also reduce the strength of the transient, which can further reduce the likelihood of a false data bit being detected.

Timing diagram 306 shows a communication pattern where the subcarrier pulses occur near the end of the last data-carrying symbol period, which is the symbol period immediately preceding the unmodulated symbol period (e.g., representing the EOC). Relative to timing diagrams 302 and 304, the duration that the transient is above the threshold 314 is longer and simply shortening the duration of the last pulse 310 may be insufficient. Accordingly, the pulse shaping shown by timing diagram 308 includes completely removing the last pulse 310.

As discussed herein, the pulse shaping can be done in other manners and combinations. For instance, each of the pulse shaping solutions depicted in timing diagrams 304 and 308 can be done in combination with a seduction, in the amplitude of the pulses. The reduction can be accomplished by reducing the drive strength of the ALM (or by using only passive load modulation). In some instances, the last poise 310 can be completely removed while the second to last pulse can also be shortened.

Figure 4:
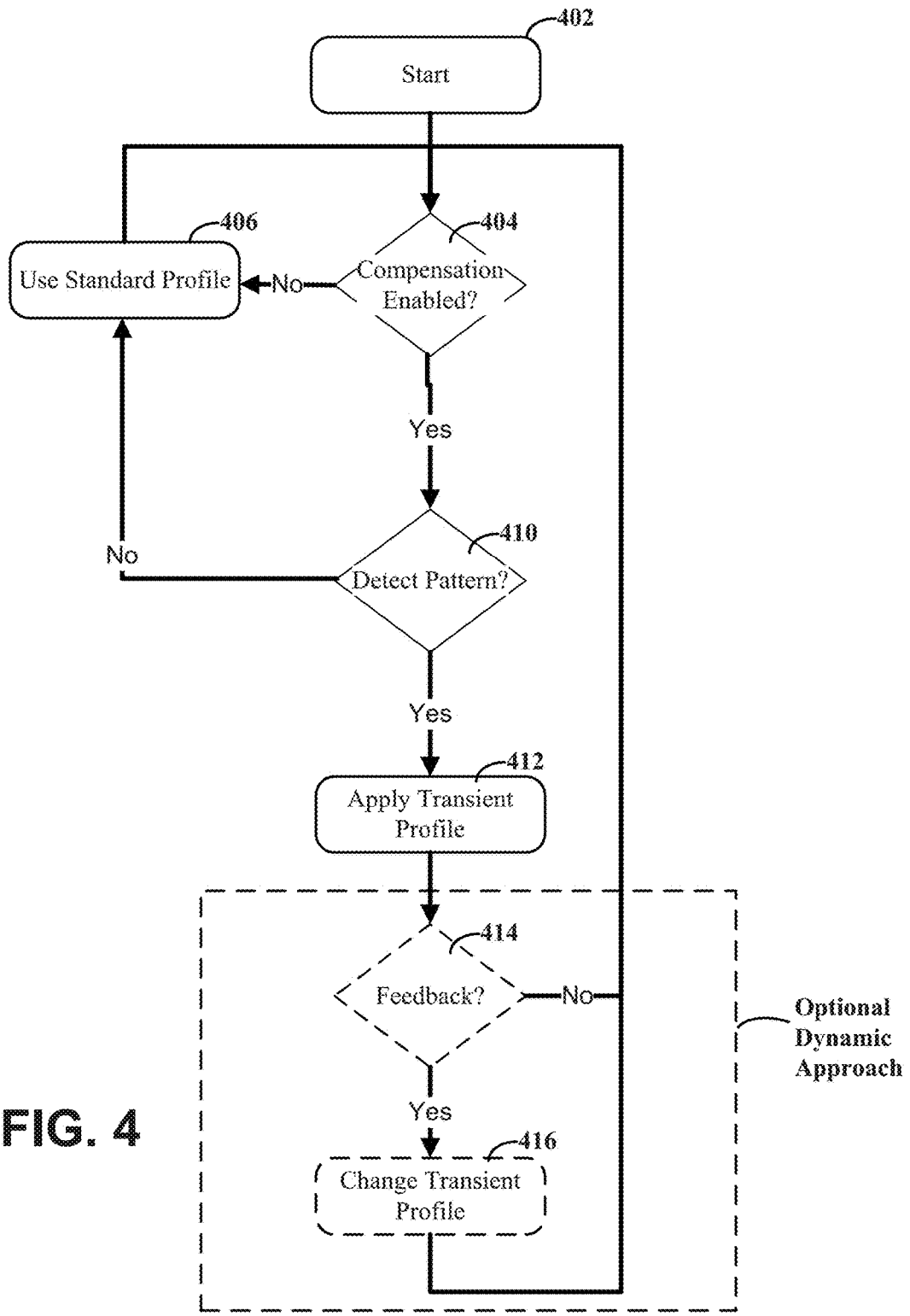
FIG. 4 depicts a flow diagram for use with a transmitter device with pulse shaping capabilities, consistent with embodiment of the present disclosure.

FIG. 4 depicts a flow diagram for use with a transmitter device with pulse shaping capabilities, consistent with embodiments of the present disclosure. The flow beings at block 402 with start of a transmission. The transmitter device determines whether or not transient compensation, consistent with the discussion herein, is enabled at decision block 404. If transient compensation is not enabled, then a standard pulse shaping profile (or no pulse shaping at all) can be used, per block 406. If transient compensation is enabled, the transmitter device can attempt to detect a particular pattern that is subject to problems with transients, per block 410.

In some embodiments, the transmitter device may always have transient compensation enabled, in which case, decision block 404 can be skipped. Various embodiments allow for transient compensation to be selectively enabled. For example, the transient compensation could be determined based upon a manufacturer setting that corresponds to the particular type of device and/or application for which the transmitter is feeing used (e.g., a cellular telephone vs a laptop computer). This allows the transmitter circuit to be configured for different applications, some (c)f which may not need or benefit from transient compensation. In some instances, the enable condition can be dynamically set based upon failed communication attempts. For example, the transient compensation could start out disabled and be enabled in response to a failed attempt at communication (e.g., due to a false bit caused by a transient in an unmodulated symbol period).

If the transmitter device does not detect a particular pattern (e.g., a particular bit in a symbol period that proceeds an unmodulated symbol period), then the standard pulse shaping profile (or no pulse shaping at all) can be used, per block 406. If the particular pattern is detected by the transmitter device, then a transient profile can be applied for pulse shaping, per block 412.

Consistent with some embodiments, the transmitter device can optionally change and adjust the dynamically transient profile in response to feedback from the system, per blocks 414 and 416. This can include, for example, providing feedback about unsuccessful communication attempts. In response, the transmitter device could change the transient profile to more aggressively shape the pulse by, for example, reducing the pulse duration further. If this optional adjustment to the transient profile is not used, then the flow can return to block 404 directly from block 412.

Various blocks, modules or other circuits may be implemented to carry out one or more of the operations and activities described herein and/or shown in the figures. In these contests, a "block" (also sometimes "circuits", "logic circuitry", or "module") can be implemented using a circuit that carries out one or more of these or related operations/activities. In various embodiments, a hard-wired control block can be used to minimize the area for such an implementation in case a limited flexibility is sufficient. Alternatively and/or in addition, in certain of the above-discussed embodiments, one or more modules are discreet logic circuits or programmable logic circuits configured and arranged tor implementing these operations/activities.

Based upon the above discussion, and illustrations, those skilled in the art will readily recognize that various modifications and changes may be made to the various embodiments without strictly following the exemplary embodiments and applications illustrated and described herein, For example, an apparatus can include different signal processing components and use different encoding and modulation techniques and configurations than illustrated by the various figures. Further, the various embodiments and associated features can be used in a variety of different combinations, some of which are not expressly stated for brevity. Such modifications do not depart from the true spirit and scope of various aspects of the invention, including aspects set forth in the claims.

What is claimed is:

1. A method for compensating for transients caused by load modulation by adjusting pulse shapes, the method comprising:

modulating a radio frequency (RF) carrier signal using load modulation;

detecting, for the modulated RF carrier signal, a particular symbol pattern for a first symbol that includes a plurality of pulses and that precedes a second symbol that does not use load modulation, wherein the plurality of pulses included in the first symbol is a series of pulses located at a second half of the first symbol; and adjusting, in response to the detecting, a pulse shape of the first symbol to mitigate the transients by shortening a duration for a pulse of the series of pulses.

2. The method of claim 1, wherein the detecting further includes detecting that the first symbol uses active load modulation in a second half of the first symbol.

3. The method of claim 1, wherein the adjusting further includes removing a last pulse from the series of pulses.

4. The method of claim 1, wherein the adjusting further includes reducing an amplitude for the series of pulses.

5. The method of claim 1, wherein the adjusting further includes removing a last pulse from the series of pulses, and reducing an amplitude for the series of pulses.

6. The method of claim 1, wherein the adjusting is responsive to feedback that is based upon a transient of the first symbol being detected in the second symbol.

7. The method of claim 1, wherein the modulation of the RF carrier signal is consistent with near-field communication (NFC) protocols for a card-emulation mode.

8. A device comprising
a modulation circuit configured to modulate a radio frequency (RF) carrier signal using load modulation and according to a plurality of symbols;
a detection circuit configured to detect, for the modulated RF carrier signal, a first symbol pattern of a first symbol preceding a second symbol pattern of a second symbol that does not use load modulation, wherein the first symbol includes a series of pulses located at a second half of the first symbol; and
a pulse shaping circuit configured to adjust, in response to the detection circuit, a pulse shape of the first symbol to mitigate transients in the second symbol, wherein the pulse shaping circuit is further configured to adjust the pulse shape of the first symbol by removing a last pulse from the series of pulses.

9. The device of claim 8, wherein the detection circuit is further configured to detect that the first symbol uses active load modulation in a second half of the first symbol.

10. The device of claim 8, wherein the pulse shaping circuit is further configured to adjust the pulse shape of the first symbol by shortening a duration for a pulse of the series of pulses.

11. The device of claim 8, wherein the pulse shaping circuit is further configured to adjust the pulse shape of the first symbol by removing a last pulse from the series of pulses.

12. The device of claim 8, wherein the pulse shaping circuit is further configured to adjust the pulse shape of the first symbol by reducing an amplitude for the series of pulses.

13. The device of claim 8, wherein the pulse shaping circuit is further configured to adjust the pulse shape of the first symbol in response to feedback that is based upon transients of the first symbol being detected in the second symbol.

14. The device of claim 8, wherein the RF carrier signal and the plurality of symbols are consistent with near-field communication (NFC) protocols for a card-emulation mode.

15. A device comprising
a modulation circuit configured to modulate a radio frequency (RF) carrier signal using load modulation and according to a plurality of symbols;
a detection circuit configured to detect, for the modulated RF carrier signal, a first symbol pattern of a first symbol including a plurality of pulses and preceding a second symbol pattern of a second symbol that does not use load modulation; and
a pulse shaping circuit configured to adjust, in response to the detection circuit, a pulse shape of the first symbol to mitigate transients in the second symbol, by reducing a duration, spanning at least one of the pulses of the first symbol.

* * * * *